(12) United States Patent
Mondal et al.

(10) Patent No.: US 9,269,259 B2
(45) Date of Patent: Feb. 23, 2016

(54) METHODS AND SYSTEMS FOR PROCESSING CROWD-SENSED DATA

(71) Applicant: Xerox Corporation, Norwalk, CT (US)

(72) Inventors: Anirban Mondal, Bangalore (IN);
Tridib Mukherjee, Bangalore (IN);
Avinash Sharma, Bangalore (IN);
Saraschandra Karanam, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 49 days.

(21) Appl. No.: 14/273,565

(22) Filed: May 9, 2014

(65) Prior Publication Data

US 2015/0325102 A1    Nov. 12, 2015

(51) Int. Cl.
G08B 25/10    (2006.01)

(52) U.S. Cl.
CPC ..................... *G08B 25/10* (2013.01)

(58) Field of Classification Search
CPC .............. G06F 17/3087; G06F 17/30705
USPC ......... 340/539.11, 905, 995.1, 539.18; 702/3; 715/771; 707/737
See application file for complete search history.

(56) References Cited

U.S. PATENT DOCUMENTS

| | | | |
|---|---|---|---|
| 2014/0067487 A1* | 3/2014 | Assuncao et al. | 705/12 |
| 2014/0282192 A1* | 9/2014 | Grossman et al. | 715/771 |
| 2015/0099481 A1* | 4/2015 | Maitre et al. | 455/404.2 |
| 2015/0222672 A1* | 8/2015 | Vaughn et al. | 709/204 |

OTHER PUBLICATIONS

Min Mun et al. "PEIR, the personal environmental impact report, as a platform for participatory sensing systems research", ACM MobiSys 2009.
Prashanth Mohan, Venkata N. Padmanabhan, and Ramachandran Ramjee. 2008. Nericell: rich monitoring of road and traffic conditions using mobile smartphones. In Proceedings of the 6th ACM conference on Embedded network sensor systems (SenSys '08).
K. Crammer and Y. Singer. On the Algorithmic Implementation of Multi-class SVMs, JMLR, 2001.
Suhas Mathur, Tong Jin, Nikhil Kasturirangan, Janani Chandrasekaran, Wenzhi Xue, Marco Gruteser, and Wade Trappe. 2010. ParkNet: drive-by sensing of road-side parking statistics. In Proceedings of the 8th international conference on Mobile systems, applications, and services (MobiSys '10).
Lowe, D. G., "Distinctive Image Features from Scale-Invariant Keypoints", International Journal of Computer Vision, 60, 2, pp. 91-110, 2004.

* cited by examiner

*Primary Examiner* — Toan N Pham (57) ABSTRACT

The disclosed embodiments illustrate methods and systems for processing crowd-sensed data. The method includes receiving the crowd-sensed data from a mobile device associated with a user. The crowd-sensed data corresponds to metadata of an event pertaining to an aberration in at least one of a public service, a public infrastructure, a private service, or a private infrastructure. Thereafter, the event may be prioritized based at least on a type of the event, a measure of impact of the event, or a measure of urgency to resolve the event. Further, a notification of the event may be transmitted to an organization responsible to at least resolve the event, based on the prioritizing, wherein the notification comprises at least the metadata.

24 Claims, 5 Drawing Sheets

METHODS AND SYSTEMS FOR PROCESSING CROWD-SENSED DATA

TECHNICAL FIELD

The presently disclosed embodiments are related, in general, to a crowdsourcing system. More particularly, the presently disclosed embodiments are related to methods and systems for processing crowd-sensed data.

BACKGROUND

Development in a city may involve development of infrastructure. In an embodiment, the development of said infrastructure may include developing public infrastructure such as, but not limited to, roads, hospitals, and metros. The development of infrastructure may also include the development of private infrastructure such as, but not limited to, housing societies, private homes, and the like.

The infrastructure may require regular maintenance to provide seamless service to the public. To determine the maintenance need in the said infrastructure, one or more sensors may be installed to monitor the condition of the infrastructure. For instance, sensors/cameras may be installed to determine or detect potholes on the road. However, processing the data captured through the sensors may have various limitations that are inherent to the techniques used for detecting such aberrations in the infrastructure (e.g., image processing and machine learning techniques). For instance, image processing techniques may be limited by the lighting conditions in which the image was captured by the sensor. Further, the machine learning techniques may be constrained by the robustness of data based on which the system was trained.

SUMMARY

According to embodiments illustrated herein there is provided a method for processing crowd-sensed data. The method includes receiving, by one or more processors, the crowd-sensed data from a mobile device associated with a user. The crowd-sensed data corresponds to metadata of an event pertaining to an aberration in at least one of a public service, a public infrastructure, a private service, or a private infrastructure. Thereafter, the event may be prioritized by the one or more processors based at least on a type of the event, a measure of impact of the event, or a measure of urgency to resolve the event. Further, a notification of the event may be transmitted by the one or more processors to an organization responsible to at least resolve the event, based on the prioritizing, wherein the notification comprises at least the metadata.

According to embodiments illustrated herein there is provided a system for processing crowd-sensed data. The system includes one or more processors configured to receive the crowd-sensed data from a mobile device associated with a user. The crowd-sensed data corresponds to metadata of an event pertaining to an aberration in at least one of a public service, a public infrastructure, a private service, or a private infrastructure. The one or more processors are further configured to prioritize the event based at least on a type of the event, a measure of impact of the event, or a measure of urgency to resolve the event. Furthermore, the one or more processors are configured to transmit a notification of the event to an organization responsible to at least resolve the event, based on the prioritizing, wherein the notification comprises at least the metadata.

According to embodiment illustrated herein there is provided a computer program product for use with a computer. The computer program product comprising a non-transitory computer readable medium. The non-transitory computer readable medium stores a computer program code for processing crowd-sensed data. The computer program code is executable by one or more processors to receive the crowd-sensed data from a mobile device associated with a user, wherein the crowd-sensed data corresponds to metadata of an event pertaining to an aberration in at least one of a public service, a public infrastructure, a private service, or a private infrastructure. The event is prioritized based at least on a type of the event, a measure of impact of the event, or a measure of urgency to resolve the event. A notification of the event is transmitted to an organization responsible to at least resolve the event, based on the prioritizing, wherein the notification comprises at least the metadata.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not limit, the scope in any manner, wherein similar designations denote similar elements, and in which.

DETAILED DESCRIPTION

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes, as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "at least one embodiment," "an embodiment," "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

"Crowd-sensed data" may refer to any data that has been collected from one or more users around the globe. For example, the one or more users may be from a city and may have observed an aberration in at least one of a public service, a public infrastructure, a private service, or a private infrastructure. Further, the one or more users may also report a natural disaster or an environmental problem/issue. The one or more users may have recorded the aberration/issue and accordingly reported the incident. Such reporting of the incident by the one or more users may correspond to the crowd-sensed data. The term "crowd-sensed data" is interchangeably referred as "event report" hereinafter.

A "user" refers to an individual who registers with for reporting of events through his/her computing devices. In an embodiment, the user may provide the crowd-sensed data associated with an event, when the user notices any event in his/her vicinity. The term "user" has been interchangeably referred as "resident", "citizen", "individual", or "user" hereinafter.

An "event" refers to an aberration in at least one of a public service, a public infrastructure, a private service, or a private infrastructure. In an embodiment, the event may also correspond to a natural disaster or an environmental problem/issue. In an embodiment, the event may reported by at least one user.

"Public infrastructure/service" refers to an infrastructure/service that may be provided by a government of a nation for public use. Some examples of public infrastructure/service may include, but are not limited to, roads, government buildings, street lights, public transportation system, water supply systems, etc.

"Private infrastructure/service" refers to a privately owned infrastructure/service. In an embodiment, the privately owned infrastructure/service may include, but are not limited to, a housing society, a private home or an apartment, etc.

A "type of event" refers a category allocated to an event. In an embodiment, the one or more categories of an event may be predefined. For example, the one or more categories of event may include, but are not limited to, traffic congestion, potholes on road, street lamp not operational, fire in a building, etc. Further, in an embodiment, a category may be dynamically added to the list of one or more categories, in case an event does not fall under any category from the one or more categories.

An "impact of an event" refers to an effect of the event on the public. For example, water logging on the roads may lead to traffic congestion, which may further impact the public on the road.

A "measure of urgency" may refer to at least a turn-around time to resolve the event. For example, a fire event reported may be acted upon immediately as fire may destroy infrastructure on a large scale. Further, the fire event may pose threat to human life. Therefore, the fire event may be assigned a high measure of urgency in comparison to any other event such as water leakage or traffic congestion.

A "notification" refers to a message signal transmitted by the one or more users to report an event. In an embodiment, the notification may include at least the metadata associated with an event. In an embodiment, the metadata associated with an event may include, but is not limited to, at least one of content, a location of the user, a time of sending the metadata, or an event tag, associated with the event. In an embodiment, the content may include an image captured using an image capturing device, a video of an event, a voice recording, etc.

A "quality metric" corresponds to a measure of quality of the content in the metadata. For instance, if the content corresponds to a voice recording, the quality metric may be determined based at least on a background noise in the voice recording. In another example, if the content corresponds to an image, the quality metric may be determined based at least on the resolution of the image, noise in the image, etc.

"Predetermined threshold" refer to a lower limit of the quality metric below which the content is not acceptable.

An "event tag" corresponds to a tag or a category assigned by a user, reporting an event, to the event. For example, the user may be reporting a water logging event. In such a scenario, the user may assign a tag to the event as "water logging".

A "historical data" corresponds to a repository of events that have been reported by one or more users in the past. In an embodiment, the historical data may include information pertaining to a time at which the event was reported, the type of the event, the impact of the event, and the urgency of the event.

"Remuneration" refers to rewards received by the one or more users for reporting an event. In an embodiment, the remuneration is a monetary compensation received by the one or more users. However, a person with ordinary skill in the art would appreciate that the scope of the disclosure is not limited to remunerating the one or more users with monetary compensation. In an embodiment, various other means of remunerating the one or more users may be employed such as, but not limited to, remunerating the one or more users with lottery tickets, giving gift items, shopping vouchers, and discount coupons. In another embodiment, the remuneration may further correspond to strengthening of the relationship between the one or more users and the event reporting system. For example, the reporting system may provide the users a reputation score based on the events reported by the users. A person skilled in the art would understand that a combination of any of the above-mentioned means of remuneration could be used for remunerating the one or more users.

"Crowdsourcing" refers to collecting information by soliciting the participation of loosely defined groups of individual users. For example, the information may correspond reporting an event by a group of users.

"One or more policies" refer to a plan of action proposed or otherwise accepted to be a set of rules governing an aspect of functioning of an organization. In an embodiment, the organization may implement the one or more policies to perform its functions. For example, an organization such as a traffic authority may set one or more policies to govern traffic movement on roads, e.g., one ways routes, speed limits, traffic lights, and so on.

Figure 1:
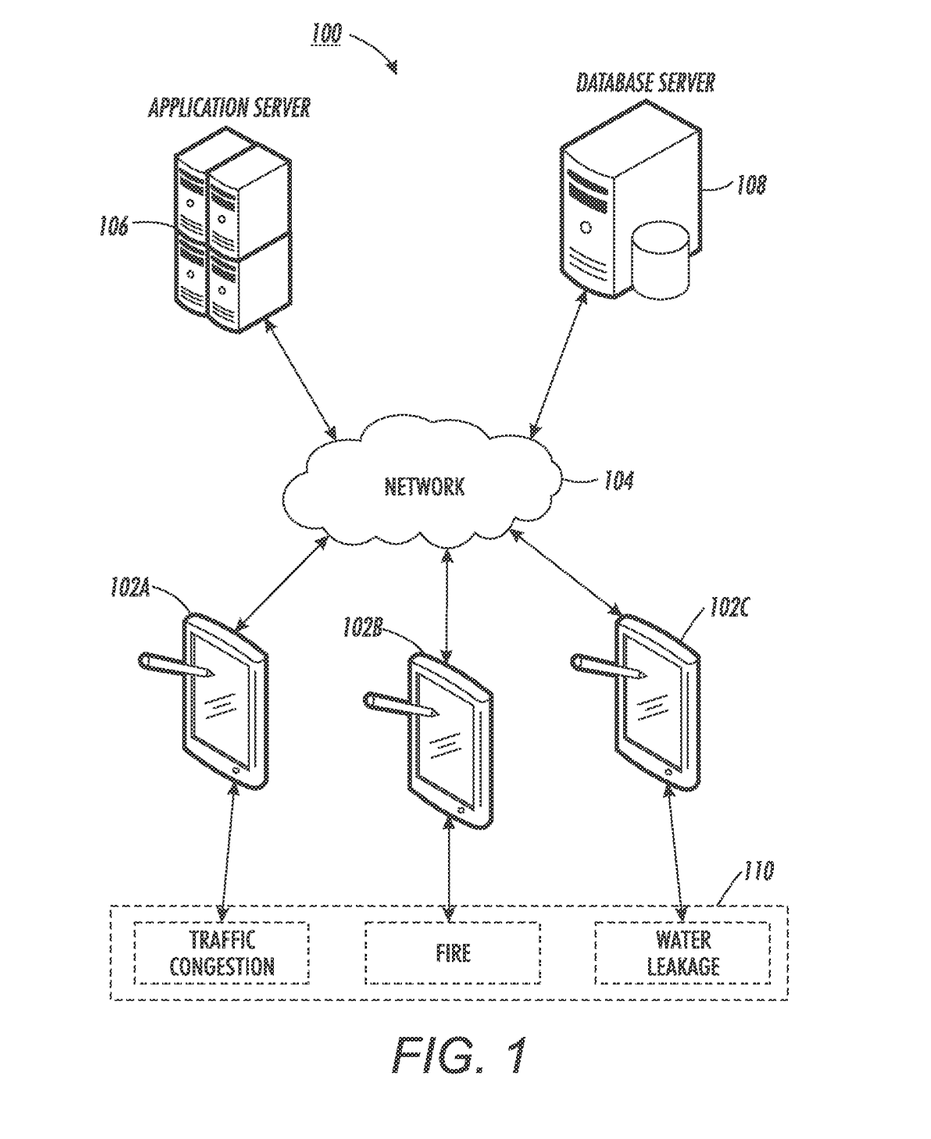
FIG. 1 is a system environment diagram, in which various embodiments may be implemented.

FIG. 1 is a system environment 100, in which various embodiments may be implemented. The system environment 100 includes one or more user computing devices 102a, 102b, and 102c (hereinafter referred as user computing devices 102), a network 104, an application server 106, and a database server 108.

The user computing devices 102 correspond to computing devices that are usable by the one or more users. In an embodiment, the user computing devices 102 may be used for reporting an event. In an embodiment, the event corresponds to an aberration in at least one of a public service, a public infrastructure, a private service, or a private infrastructure. Further, in an embodiment, the event may also correspond to a natural disaster or an environmental problem/issue. Examples of the event include traffic congestion, fire accidents, water leakage, etc. (denoted by 110 in FIG. 1). To report the event, the user computing devices 102 may include one or more sensors such as, but not limited to, a camera, audio recorder, video recorder, etc., to capture the event. Such data captured by the user computing devices 102 to report the event is hereinafter referred as crowd-sensed data. The user computing devices 102 may create the crowd-sensed data using the information captured through the one or more sensors. Thereafter, the crowd-sensed data is transmitted to the application server 106. In an embodiment, a user of a respective user computing device (e.g., 102a) may provide an input indicative of a tag assigned to the event by the user. The user may further provide an input to describe the event. In an embodiment, the user computing devices 102 may provide a user interface to the user to provide such inputs. In an embodiment, the user computing device (e.g., 102a) may correspond to a mobile device. A person having ordinary skill in the art would understand that the scope of the disclosure is not limited to the user computing devices 102 as the mobile devices. In an embodiment, the user computing devices 102 may be any computing device that has the capability to capture an event and receive the user input. Some examples of the user computing devices 102 may include, but are not limited to, a desktop, a laptop, a personal digital assistant (PDA), a tablet computer, and the like.

The network 104 corresponds to a medium through which content and messages flow between various devices of the system environment 100 (e.g., the user computing devices 102, the application server 106, and the database server 108). Examples of the network 104 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 104 in accordance with various wired and wireless communication protocols such as Transmission Control Protocol and Internet Protocol (TCP/IP), User Datagram Protocol (UDP), and 2G, 3G, or 4G communication protocols.

In an embodiment, the application server 106 may receive the crowd-sensed data, pertaining to one or more events, from the user computing devices 102. As discussed above, the crowd-sensed data includes metadata corresponding to the event. In an embodiment, the metadata associated with the event may include at least one of content, a location of the user computing device (e.g., 102a), a time of sending the metadata, or an event tag, associated with the event. In an embodiment, the application server 106 may determine a type of each of the one or more events based on respective metadata associated with each of the one or more events. Thereafter, the application server 106 may prioritize the one or more events. Based on the prioritization, the application server 106 may generate a notification. Further, the application server 106 may transmit the notification to a concerned authority as a task. In an embodiment, the task may have a service level agreement (SLA) associated with it. Further, the application server 106 may store the notification in the database server 108 as historical data. In an embodiment, the application server 106 may extract the historical data pertaining to the one or more events from the database server 108 to create a statistical model. The statistical model may be utilized to predict an occurrence of the one or more events in the future. In an embodiment, the application server 106 may be realized through various types of servers such as, but not limited to, Java server, .NET framework, and Base4 server. The operation of the application server 106 has been described later in conjunction with FIG. 3.

In an embodiment, the database server 108 is operable to store the historical data. In an embodiment, the historical data may include one or more previous occurrences of the one or more events. Further, the database server 108 may store information pertaining to the one or more users and their respective user profiles. In an embodiment, the database server 108 may receive a query from the application server 106 to extract at least the historical data or the user profiles of the one or more users. The database server 108 may be realized through various technologies such as, but not limited to, Microsoft® SQL server, Oracle, and My SQL. In an embodiment, the application server 106 may connect to the database server 108 using one or more protocols such as, but not limited to, Open Database Connectivity (ODBC) protocol and Java Database Connectivity (JDBC) protocol.

Figure 2:
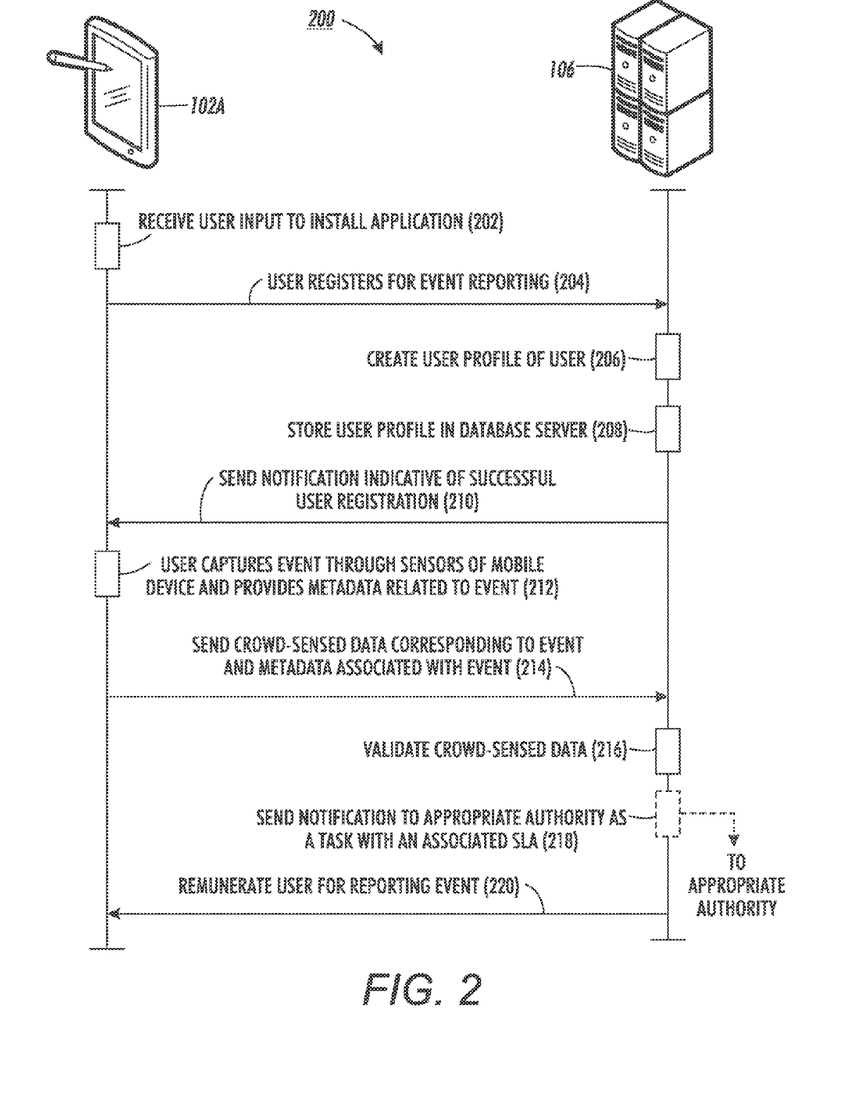
FIG. 2 is a message flow diagram illustrating sharing of the messages/data among the entities of the system environment, in accordance with at least one embodiment.

The operations of the system environment 100 are described in conjunction with FIG. 2.

FIG. 2 is a message flow diagram 200 illustrating sharing of the messages/data among the entities of the system environment 100, in accordance with at least one embodiment. The message flow diagram 200 is described in conjunction with FIG. 1.

The user computing device 102a may receive an input from the user to install an application (depicted by 202). In an embodiment, the application enables the capturing and reporting of the event. In an embodiment, the user computing device 102a may receive the application from an application store/marketplace such as Google Play®, Windows Store®, or Apple iTunes Store®. Post installation of the application, the user may register with the application server 106 (depicted by 204). In an embodiment, registering with the application server 106 may involve creating a user account.

On receiving the request to create the user account, the application server 106, creates a user profile of the user (depicted by 206). The application server 106 stores the user profile of the user in the database server 108 (depicted by 208). Further, the application server 106 may send a notification to the user, indicative of the successful registration (depicted by 210).

The user of the user computing device 102a may come across an aberration in the public infrastructure/service which he/she may want to report. In such a scenario, the user of the user computing device 102a may capture the event using the one or more sensors in the mobile computing device 102a (depicted by 212). In an embodiment, the user may utilize the application to capture the event. In an embodiment, capturing the event may further involve assigning the event tag and the event description to the captured aberration. The application in the user computing device 102a may create the crowd-sensed data. In an embodiment, the crowd-sensed data may include the event and associated metadata thereof. The user computing device 102a may send the crowd-sensed data to the application server 106 (depicted by 214).

On receiving the crowd-sensed data, the application server 106 may validate the crowd-sensed data (depicted by 216). The validation of the crowd-sensed data is described later in conjunction with FIG. 4. Post the validation of the crowd-sensed data, the application server 106 may send a notification to appropriate authority as a task (depicted by 218). In an embodiment, the task may have an associated SLA according to which the authority may resolve the event. Concurrently, the application server 106 may update the historical data in the database server 220. Further, the application server 106 may remunerate the user of the user computing device 102a for reporting the event (depicted by 220).

Figure 3:
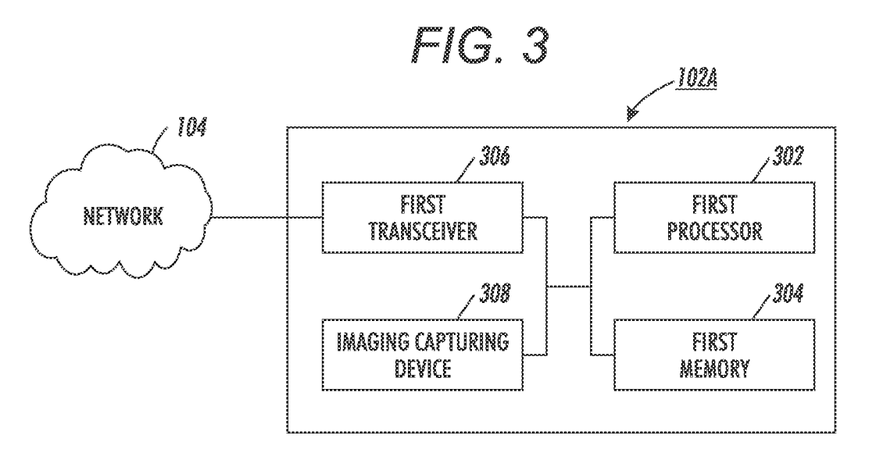
FIG. 3 is a block diagram of a user computing device, in accordance with at least one embodiment.

FIG. 3 is a block diagram of the user computing device 102a, in accordance with at least one embodiment. The user computing device 102a includes a first processor 302, a first memory 304, a first transceiver 306, and an image capturing device 308. The block diagram of the user computing device (e.g., 102a) has been described in conjunction with FIG. 1 and FIG. 2.

The first processor 302 is coupled to the first memory 304, the first transceiver 306, and the image capturing device 308. The first processor 302 includes suitable logic, circuitry, and/or interfaces that are operable to execute one or more instructions stored in the first memory 304 to perform predetermined operations. The first memory 304 may be operable to store the one or more instructions. The first processor 302 may be implemented using one or more processor technologies known in the art. Examples of the first processor 302 may include, but are not limited to, an X86 processor, a RISC processor, an ASIC processor, a CISC processor, or any other processor.

The first memory 304 stores a set of instructions and data. Some of the commonly known memory implementations include, but are not limited to, a random access memory (RAM), a read only memory (ROM), a hard disk drive (HDD), and a secure digital (SD) card. Further, the first memory 304 includes the one or more instructions that are executable by the first processor 302 to perform specific operations. It will be apparent to a person having ordinary skills in the art that the one or more instructions stored in the first memory 304 may enable the hardware of the user computing device 102a to perform the predetermined operations.

The first transceiver 306 transmits and receives messages and data to/from various devices of the system environment 100 (e.g., the application server 106, and the database server 108). Examples of the first transceiver 306 may include, but are not limited to, an antenna, an Ethernet port, a USB port or any other port that can be configured to receive and transmit data. The first transceiver 306 transmits and receives data/messages in accordance with the various communication protocols such as, but not limited to, TCP/IP, UDP, and 2G, 3G, or 4G communication protocols. In another embodiment, the first transceiver 306 may be configured to receive GPS coordinates from one or more GPS satellites. The GPS coordinates are utilizable to determine the location of the user computing device 102a. In yet another embodiment, the location of the user computing device 102a may be determined by a triangulation method.

The image capturing device 308 is configured to capture at least an image or a video of the event. In an embodiment, the image capturing device 308 may include a charge coupled device (CCD) based sensor or a CMOS sensor that may be used for capturing the event. The image capturing device 308 may store the captured image in the first memory 304. Further, the first processor 302, prior to transmitting the image to the application server 106, may process the stored image. In an embodiment, the image capturing device 308 may correspond to an embedded camera within the user computing device (e.g., 102a).

Figure 4:
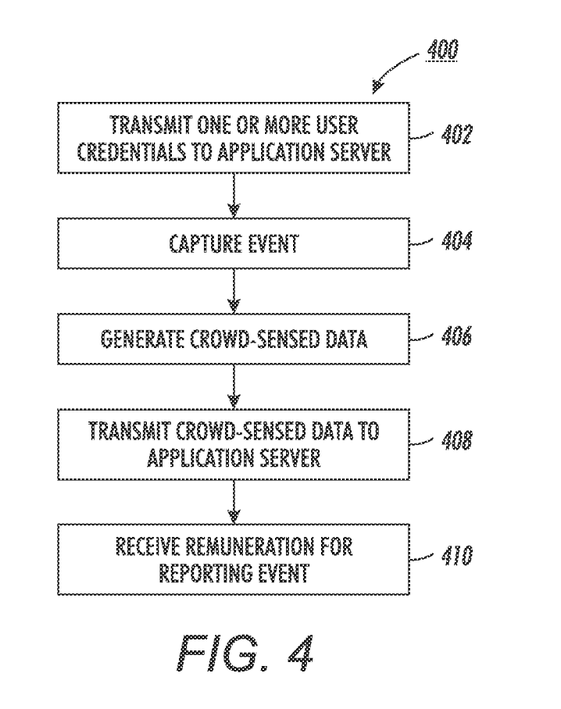
FIG. 4 is a flowchart illustrating a method for capturing an event, in accordance with at least one embodiment.

The operation of the user computing device 102a has been described in conjunction with FIG. 4.

FIG. 4 is a flowchart 400 illustrating a method of capturing the event, in accordance with at least one embodiment. The flowchart 400 has been described in conjunction with FIG. 1, FIG. 2, and FIG. 3.

At step 402, one or more user credentials are transmitted to the application server 106. In an embodiment, the first processor 302 transmits the one or more user credentials. Prior to transmitting the one or more user credentials, the first processor 302 may receive an application that is utilizable to capture the one or more events. The user of the user computing device 102a may install the application. Post installation of the application, the user may register with the application server 106 through the installed application. In an embodiment, the registration of the user may involve creating a user profile by the user. In an embodiment, the user profile may contain information pertaining to a name of the user, a password, a job profile of the user, hobbies of the user, etc.

After the registration, the user may login to the application server 106 by transmitting the one or more user credentials to the application server 106. The application server 106 may authenticate the one or more user credentials and accordingly send a notification to the user computing device 102a. In an embodiment, the notification may be indicative of at least a successful authentication of the user.

At step 404, an event is captured. In an embodiment, the first processor 302 captures the event. In an embodiment, the user of the user computing device 102a may come across an aberration related to the public infrastructure/service or private infrastructure/service. Further, the user may wish to report a natural disaster or an environmental problem/issue that the user notices in his/her surroundings. In such a scenario, the user may utilize the installed application (post the authentication) to capture the event. In an embodiment, the installed application provides a user interface to the user, which allows the user to access the image capturing device 308 of the user computing device 102a to capture the event. In an embodiment, the user may capture an image of the event. In another embodiment, the user may capture a video of the event.

Post capturing of the video/image of the event, the first processor 302 may present a user interface to the user. In an embodiment, the user interface allows the user to input a location of the user, assign a tag to the event, input a description of the event, a time at which the event was captured, etc. In an embodiment, the location of the user, the event tag, the description of the event, the time at which the event was captured, etc., may constitute the metadata associated with the event. In an embodiment, the event tag may correspond to a type of event. In an embodiment, the user interface of the application may provide a drop down menu to the user, which has one or more predefined event tags from which the user may select an appropriate tag. Further, in an embodiment, the location of event may be determined based on the GPS coordinates captured by the first transceiver 306. In alternate embodiment, the user may manually input the location of the event.

At step 406, the crowd-sensed data is generated. In an embodiment, the first processor 302 generates the crowd-sensed data. In an embodiment, the crowd-sensed data includes the metadata of the event.

At step 406, the crowd-sensed data is transmitted to the application server 106. In an embodiment, the first processor 302 transmits the crowd-sensed data to the application server 106 through the first transceiver 306.

At step 408, remuneration is received by the user. In an embodiment, the processor 202 may receive a notification from the application server 106 indicative of the remuneration.

Figure 5:
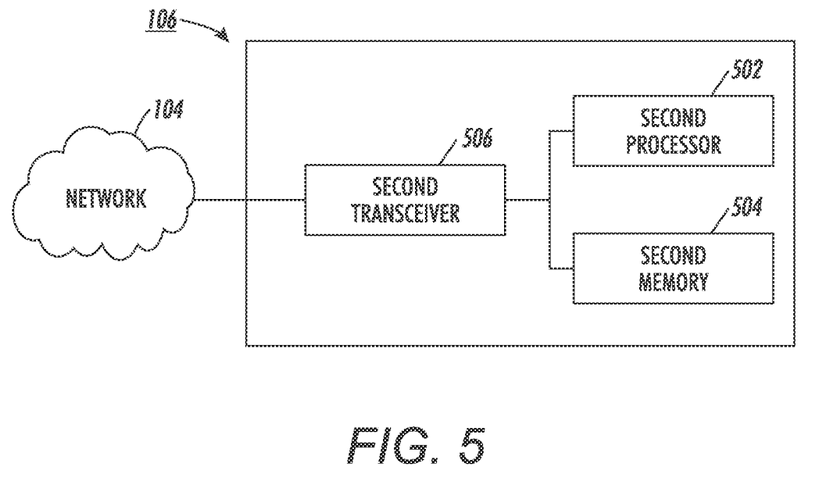
FIG. 5 is a block diagram of an application server, in accordance with at least one embodiment.

FIG. 5 is a block diagram of the application server 106, in accordance with at least one embodiment. In an embodiment, the application server 106 includes a second processor 502, a second memory 504, and a second transceiver 506.

The second processor 502 is coupled to the second memory 504, and the second transceiver 506. The second processor 502 includes suitable logic, circuitry, and/or interfaces that are operable to execute one or more instructions stored in the second memory 504 to perform predetermined operations. The second memory 504 may be operable to store the one or more instructions. The second processor 502 may be implemented using one or more processor technologies known in the art. Examples of the second processor 502 may include, but are not limited to, an X86 processor, a RISC processor, an ASIC processor, a CISC processor, or any other processor.

The second memory 504 stores a set of instructions and data. Some of the commonly known memory implementations may include, but are not limited to, a random access memory (RAM), a read only memory (ROM), a hard disk drive (HDD), and a secure digital (SD) card. Further, the second memory 504 includes the one or more instructions that are executable by the second processor 502 to perform specific operations. It will be apparent to a person having ordinary skills in the art that the one or more instructions stored in the second memory 504 may enable the hardware of the application server 106 to perform the predetermined operations.

The second transceiver 506 transmits and receives messages and data to/from various devices of the system environment 100 (e.g., the user computing devices 102, and the database server 108). Examples of the second transceiver 506 may include, but are not limited to, an antenna, an Ethernet port, a USB port or any other port that can be configured to receive and transmit data. The second transceiver 506 transmits and receives data/messages in accordance with the various communication protocols such as, TCP/IP, UDP, and 2G, 3G, or 4G communication protocols. The operation of the application server 106 has been described later in conjunction with FIG. 6.

Figure 6:
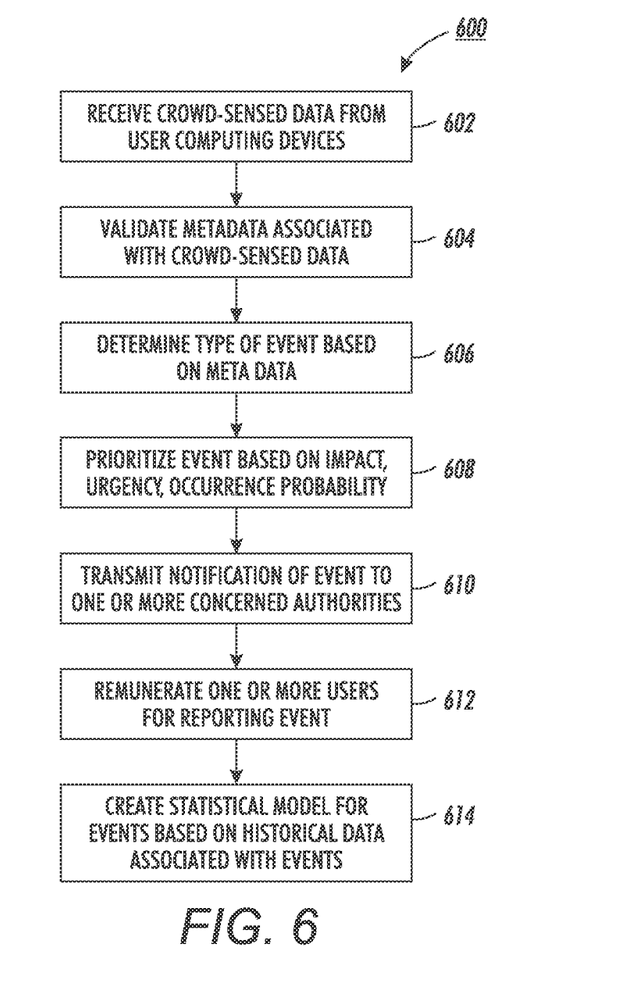
FIG. 6 is a flowchart illustrating a method for processing crowd-sensed data, in accordance with at least one embodiment.

FIG. 6 is a flowchart 600 illustrating a method for processing the crowd-sensed data, in accordance with at least one embodiment. The flowchart 600 has been described in conjunction with FIG. 1, FIG. 2, FIG. 3, FIG. 4, and FIG. 5.

At step 602, the crowd-sensed data is received from the user computing devices 102. In an embodiment, the second processor 502 receives the crowd-sensed data through the second transceiver 506. Prior to receiving the crowd-sensed data, the second processor 502 receives the one or more user credentials from the user computing devices 102. In an embodiment, the second processor 502 may authenticate the user by comparing the received one or more user credentials with the one or more credentials stored in the database server 108. Post authenticating the one or more user-credentials, the second processor 502 may receive the crowd-sensed data from the user computing devices 102. In an embodiment, the crowd-sensed data received from the user computing devices 102 includes the metadata pertaining to the events captured by the respective user computing devices 102. The following table illustrates an example of the metadata pertaining to the one or more events received from the user computing devices 102:

TABLE 1

Example of metadata pertaining to the one or more events

| Events | Event tag | Location | Time |
| --- | --- | --- | --- |
| Event-1 | Fire | 28.6100° N, 77.2300° E | 01:43PM |
| Event-2 | Traffic congestion | 28.7100° N, 77.3300° E | 5:43PM |
| Event-3 | Potholes | 28.7100° N, 77.4300° E | 10:00AM |
| Event-4 | Water leakage | 28.2100° N, 77.9300° E | 12:00PM |

Referring to Table 1, the metadata for the event-1 includes the event tag "fire". Further, location of the event-1 is "28.6100° N, 77.2300° E" and the time of the reporting of the event is 1:43 PM. Some examples of known event types have been described later.

At step 604, the metadata associated with the crowd-sensed data is validated. In an embodiment, the second processor 502 is configured to validate the metadata. In an embodiment, the validation of the metadata includes at least one of ensuring data quality, data completeness, and data consistency.

Data Quality

In an embodiment, the second processor 502 extracts the content captured by the user from the metadata associated with the event. As described above, the content may be a video file or an image file associated with the event. Thereafter, the second processor 502 may utilize one or more machine learning techniques to analyze the content. In an embodiment, the second processor 502 determines whether the content is noisy. Some examples of the one or more machine learning techniques may include, but are not limited to, support vector machine (SVM), neural networks, genetic algorithm, etc. In an embodiment, the second processor 502 may assign a score to the content based on the analysis. In an alternate embodiment, the second processor 502 may categorize the content in one or more predefined categories based on the quality of the content. Further, the categories may be indicative of the score of the content.

For example, the crowd-sensed data received for an event by the second processor 502 includes a first content and a second content. The first content is a blurry image while the second content is a clean image. The second processor 502 may assign a higher score to the second content as compared to the first content. In another embodiment, the second processor 502 may categorize the first content under the noisy image category while the second content may be categorized under the clean image category.

Post determining the score of the content, the second processor 502 may compare the score with a predetermined threshold. In an embodiment, the predetermined threshold may correspond to an upper limit of the score below which the content is considered as noisy. If the content is noisy, the second processor 502 may discard the content. Further, if the second processor 502 determines that the content is not noisy, the content is selected for further processing.

A person having ordinary skill in the art would understand that the scope of the disclosure is not limited to determining the quality of the content by using the one or more machine learning techniques. Various other techniques may be used for determining the quality of the content such as image processing techniques.

Data Completeness

In addition to the quality of the content, the second processor 502 may also determine the completeness of the content. In an embodiment, the completeness of the content may correspond to a determination of whether or not the information present in the metadata is complete. For example, the second processor 502 may receive crowd-sensed data reporting an event of traffic congestion. However, if the metadata does not include information pertaining to the location of the traffic congestion, the second processor 502 may mark such content as incomplete.

Considering another example in which the second processor 502 receives crowd-sensed data reporting a fire event. However, if the crowd-sensed data does not include information pertaining to the time of the event, the second processor 502 may mark such event as incomplete.

Data Consistency

In an embodiment, the second processor 502 may validate the metadata for presence of garbage values. To check the metadata for garbage values, the second processor 502 may first determine a data type of the information. For example, latitude and longitude may have the data type "numeral". Further, time field in the metadata may have the data type of "date-time". Thereafter, the second processor 502 determines that whether or not the information present in the metadata is in accordance with the respective data types. For example, if the coordinates or location field in the metadata includes alphabets, the data in the location field may not be consistent, and hence may contain garbage values.

A person having ordinary skill in the art would understand that the scope of the disclosure is not limited to checking the data consistency based on the data types. In an embodiment, the processor 502 may employ one or more rules to determine data consistency in the metadata. For example, the processor may employ a rule that if the time field within the metadata includes numeral greater than "24" then the data is inconsistent. Similar rules may be employed on other fields in the metadata.

In an embodiment, the validation further includes determining a count of reports of the event received from a particular area/location. For example, if a fire incident occurs in a populated place, many people may observe this fire incident and some of these people may this event to the application server 106 using the application installed on the respective user computing devices 102. Since the application server 106 receives many reports of the fire incident from the same location, the application server 106 may validate this report to be legitimate. For instance, if the fire incident is reported by a single user, the application server 106 may mark the incident as non-legitimate owing to the fact that an incident like a fire incident occurring in a populated area generally catches the attention of a large crowd. Hence, at least a few people (say 10 or more) should have reported the incident, making the report received from the single user seem suspicious/non-legitimate.

At step 606, a type of the event is determined. In an embodiment, the second processor 502 determines the type of the event. As discussed, the second processor 502 may receive the crowd-sensed data from the user computing devices 102. The second processor 502 may extract the metadata from the crowd-sensed data received from each user-computing device (e.g., 102a). Based on the event tag assigned by the user (as determined from the event metadata), the second processor 502 may determine the type of the event.

In a scenario, where the event tag is not present in the metadata, the second processor 502 may analyze the content in the metadata using one or more image processing techniques. The second processor 502 may extract a set of sample images from the database server 108. Thereafter, the second processor 502 may determine a similarity between the content image and the set of sample images by utilizing Scale-Invariant Feature Transform (SIFT) algorithm. In an embodiment, the set of sample images may be pre-tagged. In an embodiment, the pre-tagged images may correspond to the event type to which the sample images correspond. Based on the similarity between the content image and the set of sample images, the second processor 502 may determine the type of the event.

For example, the metadata received by the second processor 502 does not include the event tag. In such a scenario, the second processor 502 extracts a set of sample images from the database server 108. Each sample image may correspond to a particular event type. For instance, the set of sample images may include an image of a fire event, an image of a pothole, and an image of a water leakage, and so on. The second processor 502 compares the content image with each image in the set of sample images. If the content image is determined to be similar to the pothole image, the metadata of the event is considered to be of the type "potholes".

A person having ordinary skill in the art would understand that the scope of the disclosure is not limited to determining the type of the event based on the comparison of the content image with the set of sample images. In an embodiment, the second processor 502 may be utilized to train a classifier based on the set of sample images. In an embodiment, the second processor 502 may utilize a Hough transform or a Gabor filter to train the classifier. In an embodiment, the training of the classifier may involve a creation of the one or more categories corresponding to the event type. The content image is analyzed by the second processor 502 to determine image features. Thereafter, based on the image features, the second processor 502 may categorize the content image in at least one category from the one or more categories.

In a scenario, where the second processor 502 is not able to categorize the content image in any category, the second processor 502 may transmit the content image to a crowd-sourcing platform such as Amazon Mechanical Turk™, CrowdFlower™ as a task. The crowdsourcing platform may then transmit the content image to one or more crowdworkers, who then assign an event tag to the image. Thereafter, the second processor 502 may receive this event tag from the crowdsourcing platform through the second transceiver 506. The second processor 502 updates the classifier based on the event tag received from the crowdsourcing platform. Further, the second processor 502 may store the event tag in the database server 108. In an embodiment, the second processor 502 may create a new category for the event based on the event tag of the event, if the content image does not fit into any of the existing categories.

In an embodiment, the classifier may used for validating the event tags in the metadata. In an embodiment, the second processor 502 may utilize the classifier to analyze the content image and accordingly classify the content image in one of the one or more categories. Thereafter, the second processor 502 may extract the event tag from the metadata. The second processor 502 may compare the event tag with the category of the event. If the category and the event tag matches, the second processor 502 validates the event to be correct.

At step 608, the events are prioritized. In an embodiment, the second processor 502 may prioritize the events received in the form of the crowd-sensed data. In an embodiment, the second processor 502 may determine the priority of the event based on one or more attributes such as, but not limited to, an impact of the event, an urgency to resolve the event, a probability of event occurrence, and so on. In an embodiment, the information pertaining to the one or more attributes is determined from the civic bodies of the city. For instance, in a city like Venice, a high tide may cause flooding in the city. This flooding may impact the day-to-day work in the city. Further the occurrence of flooding is very often in Venice and is dependent on high tide. As the impact is high, the urgency to resolve such an issue may be high. Therefore, the priority of flooding event may be high in comparison to other events in the city of Venice. For instance, if there is a pothole on a road in Venice, and concurrently there is flooding due to high tide, the flooding event is assigned a higher priority.

The statistics of the events with respect to the one or more attributes is obtained from the civic bodies of the city. The following table illustrates an example of statistics obtained from the civic bodies of the city:

TABLE 2

Example of statistics of the events received from the civic bodies

| City | Event Type | Impact of the event | Urgency to resolve the event | Probability of event occurrence |
|---|---|---|---|---|
| Delhi | Traffic Congestion | High | High | 1 |
| | Fire | Medium | Very High | 0.3 |
| Venice | Flooding | High | High | 1 |
| | Traffic congestion | Low | Low | 0.15 |

Post determining the type of the event (at step 606) of each event, the second processor 502 compares the type of the event with the statistics (as depicted in the table 2). Based on the statistics, the second processor 502 determines the impact of the event, urgency of the event, and the probability of the occurrence of the event. Thereafter, in an embodiment, the second processor 502 may utilize the following equation to determine a priority value of the event:

$$EPV = w1*(Prob) + w2*\Omega + w3*UR \quad (1)$$

where,

EPV: Priority Value

Prob: Probability of the occurrence of the event;

$\Omega$: Impact of the event;

UR: Measure of urgency; and

{w1, w2, w3}: Weights.

In an embodiment, the second processor 502 may normalize the values of "Prob", $\Omega$ and UR to be in the range of 0 and 1. The weights (such as w1, w2, and w3) may be tunable parameters that can be defined by any consumer such as a city agency, transportation agency, etc. In an embodiment, the weights assigned to the one or more attributes may vary based on one or more pre-defined policies of these consumers. Post determining the priority value of the events, the second processor 502 sorts the events based on the priority values associated with each event.

A person skilled in the art would appreciate that the scope of the disclosure should not be limited to determining the priority value of the event, as described above. Various other techniques may be used to prioritize the event without departing from the scope of the disclosure.

At step 610, a notification is transmitted to the one or more concerned authorities. In an embodiment, the second processor 502 may transmit the notification through the second transceiver 506. As discussed, the one or more events received by the application server 106 are categorized in the one or more categories. In an embodiment, the events in each category may be resolved by a concerned authority. The following table illustrates an example of types of events and respective concerned authorities:

TABLE 3

Type of events and respective concerned authorities

| Types of events | Concerned Authority |
|---|---|
| Water logging | Water department |
| Fire | Fire department |
| Traffic congestion | Traffic police |
| Pot holes | Road department |

For the events categorized under the event tag/category of water logging, the second processor 502 may send the notification to the water department. In an embodiment, the notification is transmitted to the concerned authority in order of the priority determined in step 608.

In an embodiment, the second processor 502 may transmit the notification as a task for the one or more authorities. In an embodiment, the task may include a service level agreement according to which the one or more authorities may have to operate. Further, the SLA may vary based on the priority of the event. For example, as a fire event is high on priority, the second processor 502 may transmit the notification to the fire department as the task with an associated SLA, e.g., an estimated time of completion of the task. For instance, the fire department may be expected to release a fire brigade to the location mentioned in the task, within 5 minutes of the receipt of the task. As discussed, the task may include information pertaining to the location of the event along with the content capturing the event. The fire department may analyze the content to determine the severity of the event and accordingly send manpower/infrastructure to the location.

Further, in an embodiment, the second processor 502 may transmit the notification to one or more news agencies. In an embodiment, the one or more news agencies may utilize the notification as news. Further, the news agencies may further access the database server 108 to determine one or more trends related to the events and accordingly create news from these trends.

At step 612, the one or more users associated with the user computing device (e.g., 102a) are remunerated. In an embodiment, the second processor 502 sends a second notification to the users indicative of the respective remuneration.

At step 614, a statistical model is created based on the historical data. In an embodiment, the second processor 502 creates the statistical model. Prior to creation of the statistical model, the second processor 502 extracts the historical data pertaining to the one or more events from the database server 108. In an embodiment, the historical data is segregated based on the types of events and location of the event. In an embodiment, the statistical model is trained based on the historical data.

In an embodiment, the statistical model may have the capability to predict an occurrence of the event. In an embodiment, such prediction may be transmitted by the second processor 502 to the concerned authority. The concerned authority may accordingly make arrangements. The statistical model may predict the occurrence of the event temporally or spatially. For example, the statistical model may predict that in Australia there is a high possibility of forest fires during the summer season. Considering another example, the statistical model may be used to predict traffic congestion on the roads. Various trip planning systems may utilize this information to determine/plan routes from a source location to a destination location.

A person having ordinary skill in the art would understand that scope of the disclosure is not limited to predicting the occurrence of the event. In an embodiment, the statistical model may be used to determine trends of the event occurrence. In an embodiment, the trends may be location centric trends or temporal trends pertaining to the location. For example, trends may indicate a number of potholes that have come up on an expressway between a location A and a location B in the last monsoon season.

In an embodiment, the application server 106 may further generate a report of the one or more events. In an embodiment, the application server 106 may receive a request from a civic authority for a report. The request may include information pertaining to the type of event and location. Thereafter, in an embodiment, the application server 106 may query the database server 108 for information pertaining to the occurrence of the event in the location, where the location and the event type has been specified by the authority in the request. Based on the information, the application server 106 may generate the report. The report may include all the occurrences of event in the location and feedback related to the event from the one or more users.

Use Case (Public Infrastructure/Service)

For example, the application server 106 receives crowd-sensed data pertaining to a pothole on a major expressway. Thereafter, the application server 106 analyzes the content in the crowd-sensed data to determine whether the quality of the content is up to the mark. If the quality of the content is up to the mark, the application server 106 may validate the crowd-sensed data for completeness and data consistency (as described in step 604).

Thereafter, the application server 106 determines the type of the event based on the event tag and the image processing of the content in the crowd-sensed data. Therefore, in this case, the application server 106 determines that the type of the content is "pothole". Accordingly, the application server 106 may inform the road authorities that a pothole is present on the major expressway. In an embodiment, the application server 106 may transmit the notification as the task for the road authority. The task may include expected completion time, say two weeks. Further, the application server 106 may update the historical data in the database server 108.

In an embodiment, the users, who reported the event, may provide a feedback to the authority post the resolution of the pothole problem. In an embodiment, the feedback may be provided to the authorities to improve their service process.

A person having ordinary skill in the art would understand that the scope of the disclosure is not limited to reporting a pothole event. In an embodiment, the application server 106 may receive the crowd-sensed data pertaining to reporting of an illegal incidence or an issue in a service being provided by a government firms such as telephone service, and the like.

Use Case (Private Infrastructure/Service)

A person having ordinary skill in the art would understand that scope of the disclosure is not limited to reporting an event indicative of aberration in public infrastructure/service. In an embodiment, the application server 106 may receive the event pertaining to aberration in private infrastructure.

For example, the application server 106 receives crowd-sensed data pertaining to a plumbing or an electrical problem in a user's house or locality. Thereafter, the application server 106 analyzes the content in the crowd-sensed data to determine whether the quality of the content is up to the mark. If the quality of the content is up to the mark, the application server 106 may validate the crowd-sensed data for completeness and data consistency (as described in step 604).

Thereafter, the application server 106 determines the type of the event based on the event tag and the image processing of the content in the crowd-sensed data. Therefore, in this case, the application server 106 determines that the type of the content is a plumbing problem or an electrical problem in the user's house/locality, as the case may be. Accordingly, the application server 106 may inform the appropriate authorities about the determined problem. For instance, in case of a plumbing problem, the application server 106 may send a notification to a private/government contractor/service provider who provides plumbing services near the user's house/locality. Similarly, in case of an electrical problem, the application server 106 may send a notification to a private/government contractor/service provider who provides electrical repairing services near the user's house/locality.

A person having ordinary skill in the art would understand that the scope of the disclosure is not limited to reporting a plumbing or an electrical problem in a user's house or locality. In an embodiment, the application server 106 may receive the crowd-sensed data pertaining to reporting of various other types of problems faced by a resident (i.e., the user) of a locality/housing society.

Use Case (Natural Disaster or Environmental Problem/Issue)

For example, the application server 106 receives crowd-sensed data pertaining to a natural disaster or an environmental problem/issue. Thereafter, the application server 106 analyzes the content in the crowd-sensed data to determine whether the quality of the content is up to the mark. If the quality of the content is up to the mark, the application server 106 may validate the crowd-sensed data for completeness and data consistency (as described in step 604).

Thereafter, the application server 106 determines the type of the event based on the event tag and the image processing of the content in the crowd-sensed data. Therefore, in this case, the application server 106 determines that the type of the content is a natural disaster or an environmental problem/issue, as the case may be. Accordingly, the application server 106 may inform the appropriate authorities about the determined problem. For instance, in case of a natural disaster (e.g., flood, landslide, etc.), the application server 106 may send a notification to a weather monitoring authority or a disaster management authority. Similarly, in case of an environmental problem/issue (e.g., accumulation of garbage, sanitation issues, improper disposal of harmful chemicals/wastes, etc.), the application server 106 may send a notification to a municipal authority or a city planning agency.

Disclosed embodiments encompass numerous advantages. Various advantages of the disclosure include providing an end-to-end city management solution with relevant inputs from the residents themselves. As the residents of a place are well versed with the unique problems associated with their place of residence, the inputs provided by such residents are likely to be very relevant in solving the concerned problem. Further, as the resident is authenticated before he/she can use the event reporting application on his/her computing device, the events reported by such authenticated residents is likely to be legitimate. To further validate the incoming event reports from the residents, the metadata within each event report is checked for data quality, data completeness, and data consistency.

Further, the metadata within the crowd-sensed data is analyzed to determine the event type of the event. As described earlier, the events may be categorized/prioritized based on an impact, an urgency, or an occurrence probability, associated with each event. Thereafter, based on the category/priority of the event, one or more appropriate authorities are notified for the timely resolution of the problem/issue at hand. Further, as already described, the status of the problem/issue is tracked based on feedback received from the residents after the appropriate authorities have been notified of the problem/issue.

Another advantage of the disclosure lies in the creation of a statistical model for different types of events based on a historical data associated with the events of various types. One or more trends related to the future occurrence of the event in a particular location may be determined based on the statistical model. As discussed, the appropriate authorities may be provided reports related to such trends. The authorities may use such trends to cater for future exigencies.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing crowd-sensed data have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for processing crowd-sensed data, the method comprising:
   receiving, by one or more processors, the crowd-sensed data from a mobile device associated with a user, wherein the crowd-sensed data includes metadata of an event pertaining to an aberration in at least one of a public service, a public infrastructure, a private service, or a private infrastructure;
   prioritizing, by the one or more processors, the event based at least on a type of the event, and a priority value of the event, wherein the priority value is determined based on a measure of an impact of the event, a measure of an urgency to resolve the event, and a likelihood of an occurrence of the event; and
   transmitting, by the one or more processors, a notification of the event to an organization responsible to at least resolve the event, based on the prioritizing, wherein the notification includes at least a task associated with the event and corresponding SLAs, wherein the SLAs are determined based on the priority of the event.

2. The method of claim 1, wherein the metadata comprises at least content, a location of the mobile device, a time of sending the metadata, and an event tag, associated with the event.

3. The method of claim 2 further comprising validating, by the one or more processors, the metadata, wherein the validation comprises at least determining a quality metric of the content in the metadata.

4. The method of claim 3 further comprising comparing, by the one or more processors, the quality metric with a predetermined threshold, wherein the metadata is validated based on the comparison, and wherein the content in the metadata is accepted based on the validation.

5. The method of claim 3, wherein the validation further comprises determining a completeness of the metadata.

6. The method of claim 2 further comprising determining, by the one or more processors, the type of the event associated with the metadata based on the content and the event tag.

7. The method of claim 6 further comprising categorizing, by the one or more processors, the event in one or more categories based on the type of the event.

8. The method of claim 7 further comprising defining, by the one or more processors, a new category in the one or more categories when the type of the event is unknown, wherein the event is categorized in the new category.

9. The method of claim 1 further comprising storing, by the one or more processors, the metadata in a database as a historical data.

10. The method of claim 9 further comprising generating, by the one or more processors, one or more statistical models based on the historical data, wherein the one or more statistical models predict the occurrence of the event.

11. The method of claim 1 further comprising remunerating, by the one or more processors, the user of the mobile device for reporting the event.

12. The method of claim 11 further comprising registering, by the one or more processors, the user, wherein the registration of the user comprises creation of a user profile.

13. The method of claim 1, wherein the event further corresponds to at least a natural disaster.

14. A system for processing crowd-sensed data, the system comprising:
one or more processors configured to:
receive the crowd-sensed data from a mobile device associated with a user, wherein the crowd-sensed data corresponds to metadata of an event pertaining to an aberration in at least one of a public service, a public infrastructure, a private service, or a private infrastructure;
prioritize the event based at least on a type of the event, and a priority value of the event, wherein the priority value is determined based on a measure of an impact of the event, a measure of an urgency to resolve the event, and a likelihood of an occurrence of the event; and
transmit a notification of the event to an organization responsible to at least resolve the event, based on the prioritizing, wherein the notification includes at least a task associated with the event and corresponding SLAs, wherein the SLAs are determined based on the priority of the event.

15. The system of claim 14, wherein the metadata comprises at least one of content, a position of the mobile device, a time of sending the metadata from the mobile device, and an event tag, associated with the event.

16. The system of claim 15, wherein the one or more processors are further configured to validate the metadata, wherein the validation comprises at least determining a quality metric of the content in the metadata.

17. The system of claim 16, wherein the one or more processors are further configured to compare the quality metric with a predetermined threshold, wherein the metadata is validated based on the comparison, and wherein the content in the metadata is accepted based on the validation.

18. The system of claim 15, wherein the one or more processors are further configured to determine the type of the event associated with the metadata based on the content and the event tag.

19. The system of claim 18, wherein the one or more processors are further configured to categorize the event in one or more categories based on the type of the event.

20. The system of claim 19, wherein the one or more processors are further configured to define a new category in the one or more categories when the type of the event is unknown, wherein the event is categorized in the new category.

21. The system of claim 14, wherein the one or more processors are further configured to store the metadata in a database as a historical data.

22. The system of claim 21, wherein the one or more processors are further configured to generate one or more statistical models based on the historical data, wherein the one or more statistical models predict the occurrence of the event.

23. The system of claim 14, wherein the one or more processors are further configured to remunerate the user of the mobile device for reporting the event.

24. A computer program product for use with a computer, the computer program product comprising a non-transitory computer readable medium, wherein the non-transitory computer readable medium stores a computer program code for processing crowd-sensed data, wherein the computer program code is executable by one or more second processors to:
receive the crowd-sensed data from a mobile device associated with a user, wherein the crowd-sensed data corresponds to metadata of an event pertaining to an aberration in at least one of a public service, a public infrastructure, a private service, or a private infrastructure;
prioritize the event based at least on a type of the event, and a priority value of the event, wherein the priority value is determined based on a measure of an impact of the event, a measure of an urgency to resolve the event, and a likelihood of an occurrence of the event; and
transmit a notification of the event to an organization responsible to at least resolve the event, based on the prioritizing, wherein the notification includes at least a task associated with the event and corresponding SLAs, wherein the SLAs are determined based on the priority of the event.

* * * * *